United States Patent
Bak et al.

(10) Patent No.: US 9,860,690 B2
(45) Date of Patent: Jan. 2, 2018

(54) METHOD, APPARATUS AND PRODUCT FOR DETERMINING PRESENCE-RELATED ROLES

(71) Applicant: International Business Machines Corporation, Armink, NY (US)

(72) Inventors: Peter Bak, Yokneam Ilit (IL); Roie Melamed, Haifa (IL); Yuval Nardi, Kibbutz Kiryat Anavim (IL); Avi Yaeli, Ramot Menashe (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/011,688

(22) Filed: Feb. 1, 2016

(65) Prior Publication Data
US 2017/0223491 A1    Aug. 3, 2017

(51) Int. Cl.
*H04W 4/02*    (2009.01)
*H04W 4/04*    (2009.01)

(52) U.S. Cl.
CPC ............... *H04W 4/02* (2013.01); *H04W 4/04* (2013.01)

(58) Field of Classification Search
CPC .................................. H04W 4/02; H04W 4/04
See application file for complete search history.

(56) References Cited

U.S. PATENT DOCUMENTS

| | | | |
|---|---|---|---|
| 8,381,306 B2 | 2/2013 | McPherson et al. | |
| 9,439,995 B2* | 9/2016 | Conroy | B05B 7/2416 |
| 2008/0240616 A1* | 10/2008 | Haering | G06K 9/00771 382/294 |
| 2012/0005016 A1* | 1/2012 | Graff | G06Q 30/0242 705/14.49 |
| 2012/0117007 A1* | 5/2012 | Agrawal | G06N 99/005 706/12 |
| 2013/0073962 A1 | 3/2013 | Pendergast et al. | |
| 2014/0351892 A1 | 11/2014 | Ivanov et al. | |
| 2015/0074014 A1 | 3/2015 | Radkowski et al. | |
| 2015/0089385 A1 | 3/2015 | Radhakrishnan et al. | |

(Continued)

OTHER PUBLICATIONS

Sajjad Ahmad et al., "Design of Algorithm for Environment based Dynamic Access Control Model for Database Systems", International Journal of Computer Applications (0975-8887) vol. 21—No. 10, May 2011.

(Continued)

*Primary Examiner* — Cong Tran
(74) *Attorney, Agent, or Firm* — Ziv Glazberg

(57) ABSTRACT

Automatic determination of presence-related roles. Presence data of a plurality of users in a space comprised of one or more zones is received. For each user of the plurality of users a value of a target metric in a zone is computed based on the presence data, the target metric defining a measure of user presence. A presence-related role is assigned to a user with respect to the zone, the presence-related role being comprised in a set of one or more presence-related roles describing categories of spatiotemporal occupancy relation between the user and the zone, wherein said assigning comprises applying a mapping function on the value, the mapping function maps between values of the target metric and the one or more presence-related roles, the mapping function is affected by analytics of the presence data.

19 Claims, 5 Drawing Sheets

(56) References Cited

U.S. PATENT DOCUMENTS

2015/0105878 A1    4/2015  Jones et al.

OTHER PUBLICATIONS

Isabel F. Cruz., "A Constraint and Attribute Based Security Framework for Dynamic Role Assignment in Collaborative Environments", Collaborative Computing: Networking, Applications and Worksharing, vol. 10 of the series Lecture Notes of the Institute for Computer Sciences, Social Informatics and Telecommunications Engineering pp. 322-339, 2009.

Christos K. Georgiadis et al., "Flexible team-based access control using contexts", Proceeding SACMAT '01 Proceedings of the sixth ACM symposium on Access control models and technologies, pp. 21-27, 2001.

* cited by examiner

_US 9,860,690 B2_

METHOD, APPARATUS AND PRODUCT FOR DETERMINING PRESENCE-RELATED ROLES

TECHNICAL FIELD

The present disclosure relates to location-aware applications in general, and to determining presence-related roles, in particular.

BACKGROUND

In many practical situations there may arise a need to distinguish among users of a system or designate specific user populations which are to be treated collectively in a certain manner. For example, access control systems may be required to grant or deny access based on different access permissions associated with different types of users. Similarly, subscription management systems may distribute content selectively according to different classes of subscribers or client bases.

One approach for making such distinctions and determinations derived therefrom uses the concept of roles. Each user is assigned with one of a predefined set of role types, whereby allowing a user or an administrator to configure rules and operations with respect to the assigned roles, such as, for example, which type of users can gain access, which type of users should receive notification on a certain event, or the like.

One type of roles typically used in such contexts is based on a functional or organizational role definition, such as, for example, a manager, an employee, or the like. Another type of roles used is artifact related, such as, for example, a document owner, a person designated in a certain field within a document, or the like. Yet another type of roles used is operational or platform related, such as, for example, a model of the user's device or equipment, an operating system version, an operating system security group, or the like. The roles of these sorts are statically defined and need to be determined explicitly and in advance by an administrator of the system prior to any user engagement therewith.

BRIEF SUMMARY

One exemplary embodiment of the disclosed subject matter is a computer-implemented method comprising: receiving presence data of a plurality of users in a space comprised of one or more zones; computing for each user of the plurality of users a value of a target metric in a zone based on the presence data, the target metric defining a measure of user presence; and assigning a presence-related role to a user with respect to the zone, the presence-related role being comprised in a set of one or more presence-related roles describing categories of spatiotemporal occupancy relation between the user and the zone, wherein said assigning comprises applying a mapping function on the value, the mapping function maps between values of the target metric and the one or more presence-related roles, the mapping function is affected by analytics of the presence data.

Another exemplary embodiment of the disclosed subject matter is a computerized apparatus having a processor, the processor being adapted to perform the steps of: receiving presence data of a plurality of users in a space comprised of one or more zones; computing for each user of the plurality of users a value of a target metric in a zone based on the presence data, the target metric defining a measure of user presence; and assigning a presence-related role to a user with respect to the zone, the presence-related role being comprised in a set of one or more presence-related roles describing categories of spatiotemporal occupancy relation between the user and the zone, wherein said assigning comprises applying a mapping function on the value, the mapping function maps between values of the target metric and the one or more presence-related roles, the mapping function is affected by analytics of the presence data.

Yet another exemplary embodiment of the disclosed subject matter is a computer program product comprising a non-transitory computer readable storage medium retaining program instructions, which program instructions when read by a processor, cause the processor to perform a method comprising: receiving presence data of a plurality of users in a space comprised of one or more zones; computing for each user of the plurality of users a value of a target metric in a zone based on the presence data, the target metric defining a measure of user presence; and assigning a presence-related role to a user with respect to the zone, the presence-related role being comprised in a set of one or more presence-related roles describing categories of spatiotemporal occupancy relation between the user and the zone, wherein said assigning comprises applying a mapping function on the value, the mapping function maps between values of the target metric and the one or more presence-related roles, the mapping function is affected by analytics of the presence data.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
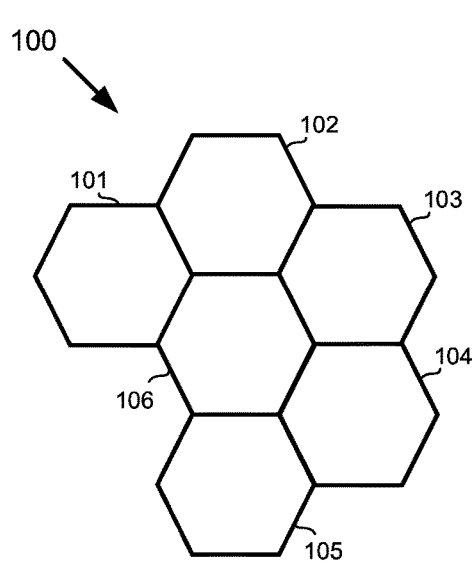
FIGS. 1A-1C show schematic illustrations of segmentations of location areas into zones of interest, in accordance with some exemplary embodiments of the subject matter.

One technical problem dealt with by the disclosed subject matter is to determine presence-related roles for one or more users or moving objects based on their location or presence data.

Another technical problem dealt with by the disclosed subject matter is to dynamically compute presence-related roles which may be assigned ad-hoc and change over time according to changes in the presence traces, environmental conditions, time segments, system parameters, or the like.

Yet another technical problem dealt with by the disclosed subject matter is to accommodate utilization of relational criteria for assigning presence-related roles, i.e., rather than being derived directly from a person's data, classifications are determined relative to others, such that an understanding of an entire population may be required prior to assigning a role label to an individual.

As an illustrative example, consider a scenario in which a public works department is considering making a change in a cycling lane and wishes to consult with the people who most often use it, e.g. by sending them a questionnaire. As another illustrative example, consider a neighborhood watchkeeper who is interested in posting messages, e.g. in the form of push notifications, only to rare visitors in one or more places that are being watched, or to be alerted of such visitors. As yet another illustrative example, one may be interested in finding out the answer to questions such as which field technician typically maintains the assets in a given area, i.e. dwells there the most, which group of people use a given sports facility the most, i.e. visit it more frequently, or the like.

One technical solution is to compute a spatiotemporal property using analytics of presence data of a plurality of users and map the result to a presence-related role. The mapping may apply statistical information derived from the presence data. The spatiotemporal property may be a value of a target metric defining a measure of user presence. The presence-related roles types may describe categories of spatiotemporal occupancy relation between a user and a location area. In some exemplary embodiments, the categories may be ordinal, e.g. relating to relative levels of user presence, such as, for example, Presence Dominator (the user whose presence is dominant with respect to a given target metric, i.e., ranks higher than the rest), Presence Co-Dominator (a user belonging to a group of users having presence dominance over the other users, wherein no single dominator exists), Presence Member (a user having a moderate presence level, i.e. not as high as of some users, but also not as low as of others), and Presence Stakeholder (a user with a relatively low presence level).

In some exemplary embodiments, the presence-related roles may be determined with relation to one or more zones of interest, such that for each zone, a presence-related role may be determined for each user relative to other users in the same zone. In some exemplary embodiments, the zones may be predefined, e.g. specified by a user. Additionally or alternatively, zones may be implicitly and/or dynamically defined. For example, presence-related roles may be computed on a zone-by-zone basis using a default or preliminary definition of zones, such as based on a natural grid or the like. Once a user or a plurality of users have been labeled with a presence-related role type, a redefinition of zones may be performed based on the labeling. For example, adjacent zones in which identical or similar presence-related roles have been assigned to the same user or group of users may be aggregated together to form one unified zone.

In some exemplary embodiments, the target metric and presence-related roles may be defined over a given time window and/or a given zone. A value of the target metric may be computed for each user with respect to the zone and/or time window based on presence data received. A distribution of values of the target metric may be determined and utilized for defining a mapping function that maps the computed target metric values to the presence-related roles. In some exemplary embodiments, a time resolution or intervals at which the target metric is computed may be further defined. For example, the target metric may be computed at an hourly, daily or weekly resolution during a time window of a week, month or year long, or the like.

In some exemplary embodiments, a set of one or more time segments may be defined, such that an assignment of a presence-related role to a user or its computation may be restricted to the periods or durations specified. Additionally or alternatively, a first presence-related role may be computed or assigned with respect to the set, while a second presence-related role may be computed or assigned for the remainder of time, or with respect to another set of time segments defined. For example, a presence-related role may be computed or assigned to a user only with respect to day time, night time, shift number, or the like. As another example, a user may be assigned with one role during the day and another role during the night.

In some exemplary embodiments, the target metric may be discrete and the distribution may be determined by computing a histogram of the values. In other exemplary embodiments, the target metric may be continuous and the distribution may be determined by estimating a probability density function. Once the distribution is learned, the mapping function may be defined accordingly by determining appropriate cut offs, such as by using quantiles, trough points, local or global extremum points, or the like, whereby the user population may be divided into two or more disjoint sets.

In yet other exemplary embodiments, the target metric may be continuous and clusters of the target metric values may be determined, such as by using k-means, Gaussian mixture models, or any other suitable clustering technique. A mapping between clusters and the presence-related roles may be determined so as to allow assignment of a presence-related role to a user based on the cluster to which the respective value of the target metric belongs. In some exemplary embodiments, clustering may be employed for analyzing user data and/or values of target metrics that are multi-dimensional. Additionally or alternatively, a redefinition of zones may be performed based on the clusters, such that each cluster is comprised in a separate zone.

One technical effect of utilizing the disclosed subject matter is to allow for definition and determination of presence-related roles that may be dynamically and implicitly determined relatively to the other users.

Another technical effect of utilizing the disclosed subject matter is to allow determination of the presence-related roles in location areas of either fixed or dynamic topology and at a desired temporal resolution.

Yet another technical effect of utilizing the disclosed subject matter is to allow utilization of the presence-related roles by other system components or operators that may not necessarily have an understanding or access to the underlying data, for various purposes such as performing evaluations, triggering actions, or the like.

Figure 1B:
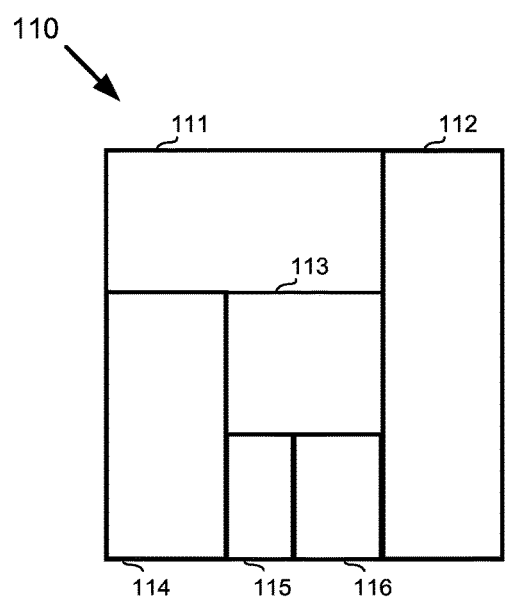
Figure 1C:
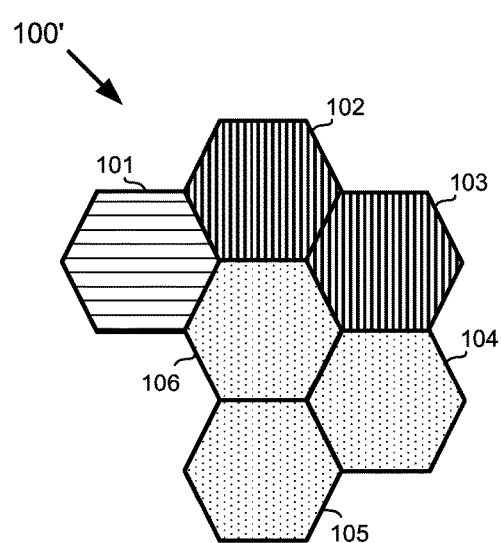

Referring now to FIGS. 1A-1C showing schematic illustrations of segmentations of location areas into zones of interest, in accordance with some exemplary embodiments of the subject matter.

FIG. 1A illustrates an example of a segmentation of a location area into zones of interest, based on a natural grid.

A location area may comprise or be segmented into one or more zones of interest, such as Zone 101, Zone 102, Zone 103, Zone 104, Zone 105 and Zone 106, denoted collectively as Segmentation 100. The location area and respective Zones 101 to 106 of Segmentation 100 may be exemplified as two-dimensional, however the disclosed subject matter is not limited to a particular dimension, and may be employed to three-dimensional location areas and zones as well. Zones 101 to 106 may be defined based on a segmentation induced by a natural grid. Zones 101 to 106 may form or be part of a tessellation of the location area. Zones 101 to 106 may be polygonal. Zones 101 to 106 may have a fixed regular shape, e.g., hexagon, square, triangle, or the like. In some exemplary embodiments, only a portion of Zones 101 to 106 may defined as the zone or zones of interest. The portion may comprise either adjacent zones, such as Zone 104 and Zone 105, or non-adjacent zones, such as Zone 101 and Zone 103.

FIG. 1B illustrates an example of a segmentation of a location area into zones of interest, based on a customized definition.

Segmentation 110 may comprise one or more zones, such as Zone 111, Zone 112, Zone 113, Zone 114, Zone 115 and Zone 116. Zones 111 to 116 may be defined on a custom basis, such as, for example, by a system developer, administrator, user, or the like. Zones 111 to 116 may be defined by specifying coordinates and/or dimensions of respective bounding boxes, e.g., "Zone 111=bbox[0, 0, 100, 100]".

While Zones 111 to 116 illustrated in FIG. 1B have a rectangular shape and no holes, the disclosed subject matter is not limited in such manner, and other types of geometric shapes or topologies may be employed.

In some exemplary embodiments, a zone may be defined as an area of a multipolygon, i.e. a combination of polygons comprised of an exterior polygon and one or more interior polygons, the exterior polygon forming an outer boundary of an area, and the interior polygons forming inner boundaries within the area, whereby excluded portions, i.e. holes, are formed. For example, the geographic area of Italy may be represented as a multipolygon, wherein the Vatican is excluded therefrom, thus creating a hole in the inner region of the country. Additionally or alternatively, a zone of any arbitrary shape may be defined by demarcation of a space region, whether bounded or unbounded, in any form of representation, e.g. polyhedral, parametric, implicit, volumetric, or the like.

In some exemplary embodiments, analytical algorithms may be used to divide the space into zones. As an example, Voronoi diagrams can be used to partition a plane into zones based on the distance from a set of points, so that each zone is considered comprising the area that is closest to a single point. The set of points can be, for example, Wi-Fi hot-spots, so that each zone represents a location that is dominated by a hot spot. Additionally or alternatively, the points may represent gas stations locations, so that each zone may represent a zone in which a gas station dominates. Any analytical algorithm may be used to divide the space in any manner useful for the analysis of the s presence-related roles.

FIG. 1C illustrates an example of a segmentation of a location area into zones types, based on presence-related roles assigned to users in each zone.

Segmentation 100' may comprise one or more types of zones, denoted in FIG. 1C by different toning textures. The zones types may be defined based on a level of similarity between presence-related roles assigned to a user or group of users in the constituent zones. Segmentation 100' may be constituent in a preliminary or default segmentation, such as Segmentation 100 of FIG. 1A. Segmentation 100' may define Zone 101 as a zone of a first type, Zones 102 and 103 as zones of a second type, and Zones 104 to 106 as zones of a third type. Segmentation 100' may aggregate adjacent zones of the same type, such as Zones 102 and 103 or Zones 104 to 106, into a single unified zone. In some exemplary embodiments, zones having identical role assignments may be unified. Additionally or alternatively, zones having substantially identical role assignments, such as matching by about 90% or more, may be unified. In case of similar but not identical roles assignments, conflicts may be resolved either by devising a majority vote rule mechanism or by a re-computation of the presence-related roles in the aggregated zone.

Referring now to 2A-2B showing schematic illustrations of distributions of values of a target metric, in accordance with some exemplary embodiments of the disclosed subject matter.

Figure 2A:
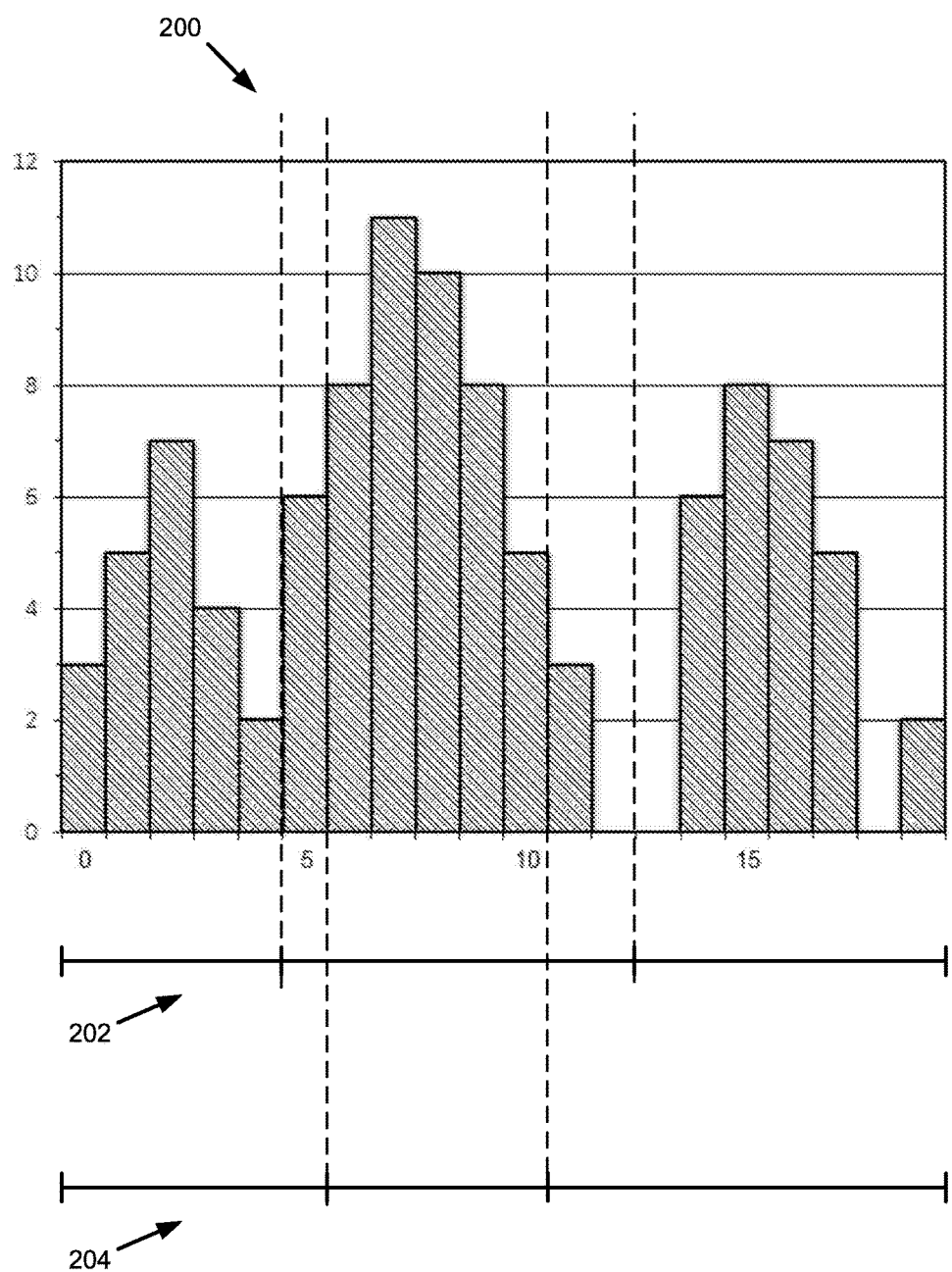
FIGS. 2A-2B show schematic illustrations of distributions of values of a target metric, in accordance with some exemplary embodiments of the disclosed subject matter.

FIG. 2A illustrates an example of a distribution of values of a discrete target metric, as described by a histogram thereof, such as Histogram 200. A histogram is a graphic representation of the frequency of different values among a given population, i.e. the percentage or number of times a certain value was observed, wherein the height and/or area of each column is proportional to the frequency of the respective value. In the context of the present disclosure, the columns of Histogram 200 may reflect the number or percentage of users that the respective values have been obtained for in the computation of the target metric. For example, the target metric may relate to the number of visits by a user in a zone. Accordingly, the columns of Histogram 200 are a count of the users that visited the zone the respective number of times, e.g., the number of users that did not visit the zone at all (zero visits) according to Histogram 200 is 3, the number of users that visited the zone exactly once is 4, and so forth.

FIG. 2A further illustrates exemplary mappings between values of the target metric as enumerated in the horizontal axis of Histogram 200 and three types of presence-related roles.

A first exemplary mapping, Mapping 202, may be defined based on the distribution depicted by Histogram 200, by using trough points of the distribution as cut-offs. For example, Mapping 202 may be defined in accordance with a first trough point obtained between the fifth and sixth columns of Histogram 200, and a second trough point obtained between the twelfth and thirteenth columns of Histogram 200. Mapping 202 may induce a categorization or ranking of the target metric values into one of the values ranges defined by the cut-off points, such as high, middle, low, and the like, which may be translated into corresponding presence-related roles, such as Presence Dominator/Co-Dominator for the high range, Presence Member for the middle range, Presence Stakeholder for the low range, and the like.

A second exemplary mapping, Mapping 204, may be similarly defined by using quantiles of the distribution depicted by Histogram 200 as the respective cut-offs. Quantiles are cut-off points that divide a set of observations into groups of equal size. As quantiles are defined based on the relative size of a subset of the users population falling within a certain range, they may be used even in cases where the distribution does not contain any trough points. Accordingly Mapping 204 may be defined based on the 3-quantiles of Histogram 200, whereby dividing the users into three groups of about third of the users in each: a first group in the range [0,6] consisting 35 users out of a total 100, a second group in the range [7,10] consisting another 34 users out of the 100, and a third group in the range [11,19] consisting the remaining 31.

Figure 2B:
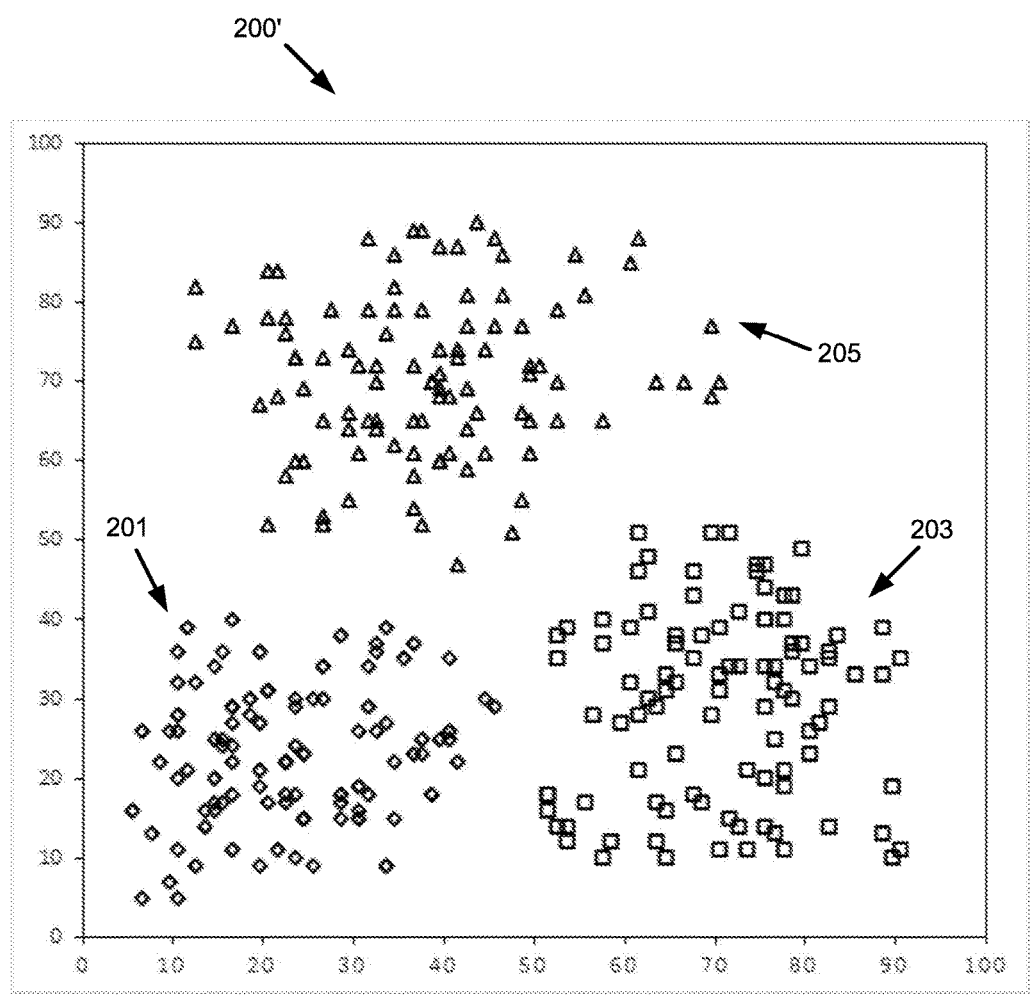

FIG. 2B illustrates an example of a distribution of values of a continuous multi-dimensional target metric, depicted by a Scatter Plot 200'. Scatter Plot 200' may be exemplified as two-dimensional, however the disclosed subject matter is not limited to a particular dimension, and other continuous target metrics of an arbitrary dimension may be employed. Scatter Plot 200' may comprise one or more clusters of points or two-variable values, such as Cluster 201, Cluster 203 and Cluster 205. Clusters 201 to 205 may be determined by employing any suitable clustering technique on the obtained data points once the target metric has been computed for the overall population of users. Clusters 201 to 205 may be used to define a mapping to corresponding presence-related roles. The mapping may be based on a relation between values of the target metric in each of the dimensions.

As an illustrative example, consider a two-coordinate target metric in which a first coordinate corresponds to a total amount of time a user spent in a zone, and a second coordinate corresponds to a total length of a trajectory traversed by the user while being in the zone. Assuming a distribution as described in Scatter Plot 200', Cluster 201 is representative of users that both spent the least amount of time and passed the shortest distance relatively to the other users in the zone, Cluster 203 is representative of users that spent about twice as much time as the users in Cluster 201 and passed relatively the same or similar distance, and Cluster 205 is representative of users that spent an amount of time which is more or less in between and traveled the longest distance. A mapping assigning presence-related roles to the users represented by Clusters 201 to 205 may be based on a ratio of distance to time. For example, Cluster 205 may be mapped to Presence Co-Dominator role type, Cluster 203 may be mapped to Presence Member role type, and Cluster 201 may be mapped to Presence Stakeholder role type.

Figure 3:
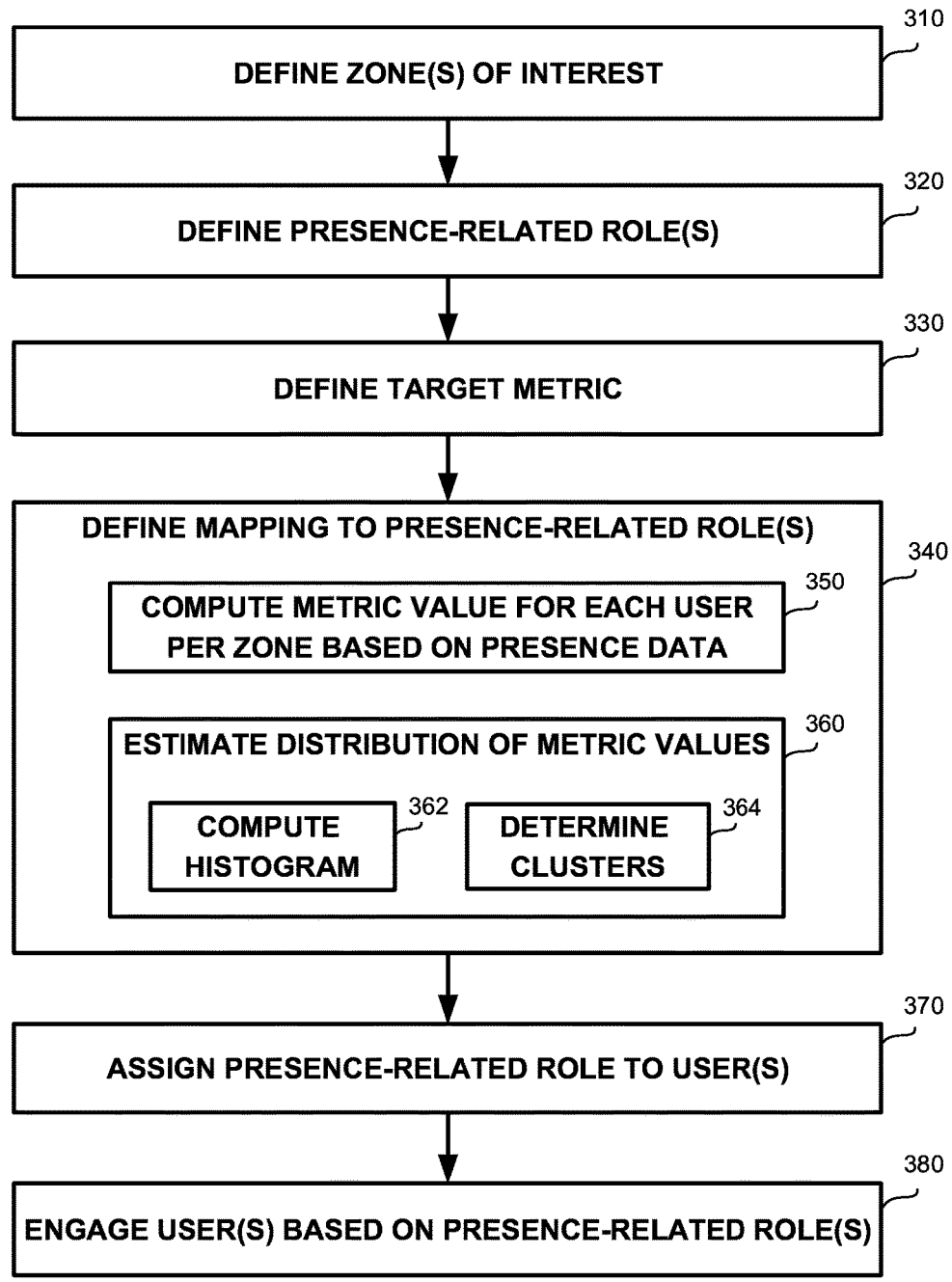
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

On Step 310, one or more zones of interest may be defined. The zones definition may be obtained by a segmentation of a location area or space into sub-areas or spaces based on a natural grid, such as Segmentation 100 of FIG. 1A. Additionally or alternatively, the zones definition may be obtained by a custom segmentation such as Segmentation 110 of FIG. 1B, which may be received as input from or customized by an operator or a designer of a system in which the disclosed subject matter is implemented.

On Step 320, one or more presence-related roles may be defined. The presence-related roles may describe categories of spatiotemporal occupancy relation between the user and a location area, or a specific zone therein. In some exemplary embodiments, the presence-related roles may be ordinal as well as categorical. For example, the one or more presence-related roles may describe a ranking of presence level based on statistical measures, such as, for example, based on relative frequency or the like. In some exemplary embodiments, the one or more presence-related roles may be selected from the group consisting of: Presence Dominator, Presence Co-Dominator, Presence Member, and Presence Stakeholder.

On Step 330, a target metric describing a measure of user presence may be defined. The target metric may be defined with respect to a given zone, selected from the one or more zones defined on Step 310, and/or with respect to a given time window. In some exemplary embodiments, each zone may be associated with its own definition of a target metric and/or time window. In some exemplary embodiments, the target metric may be further associated with a time resolution or one or more intervals at which the target metric is to be computed. For example, in case of a scenario such as one seeking to determine the most frequent visitors of a sports facility, the target metric may be defined simply as the number of visits, the time window may be a period of interest, e.g., a month, a year, or the like, and the time resolution may be of intervals of one day long each, pre-sumably since most people would usually not go to the gym more than once during the same day.

On Step 340, a mapping function between values of the target metric and the one or more presence-related roles defined on Step 320, may be defined. In some exemplary embodiments, the mapping function may be defined a priori, without knowledge of a particular distribution of the target metric values or other analytics of the presence data. For example, in case one is interested in a determination such as which technician dwells the most at a particular location, the set of presence-related roles defined on Step 320 may include only the role of Presence Dominator or Presence Co-Dominator, the target metric defined on Step 330 may be number of visits, duration of stays, or the like, and the mapping function may be defined as the maximal value observed among all users, i.e., the role of Presence Dominator may be assigned to the user that ranks the highest under the target metric, or, in case the maximal value is obtained by more than one user, each of those users may be assigned with the Presence Co-Dominator role. In other exemplary embodiments, the mapping function may be defined a posteriori based on analytics of the presence data, such as a distribution of values of the target metric among the population of users.

On Step 350, a value of the target metric in each of the one or more zones defined on Step 320 may be computed for each user based on presence data obtained. The presence data may be composed of one or more sequences of tuples denoting a location of a user at a certain time point, e.g., (USER_ID, LOCATION, TIMESTAMP).

On Step 360, a distribution of the target metric values computed on Step 350 may be estimated. In some exemplary embodiments, the target metric may be discrete and the distribution may be determined by computing a histogram of the values on Step 362, such as Histogram 200 of FIG. 2A. In other exemplary embodiments, the target metric may be continuous and the distribution may be determined by estimating a probability density function. In some further exemplary embodiments, the target metric may be multi-dimensional and clusters of the target metric values may be determined on Step 364, such as exemplified in Scatter Plot 200' of FIG. 2B. A distribution of the target metric values may be estimated based on the clusters determined, such as by fitting a Gaussian mixture model, i.e. a weighted sum of normal distributions with respective means and variances as learned from the clusters.

In some exemplary embodiments, the distribution estimated on Step 360 may be utilized for determining a mapping function of the target metric values to the presence-related roles defined on Step 320, such as by using trough points or quantiles of the histogram or density function, respectively, similarly as exemplified by Mappings 202 and 204 of FIG. 2A. In other exemplary embodiments, the mapping function may be defined based on other or additional analytics of the presence data. For example, the clusters determined on Step 364 may be mapped to presence-related roles based on other criteria, such as a relation among spreads or ranges of values in the different clusters or the like. As another example, in case of a target metric that is dependent only on the ordering of the observed values and not on their frequency, the mapping may be defined simply by sorting the values computed on Step 350 without further estimating their distribution.

In some exemplary embodiments, the mapping defined on Step 340 may be based on a target user. For example, a target user may be selected as an indicator for a predetermined presence-related role. Based on such selection, each user in the same cluster as the target user may be assigned the same predetermined presence-related role. As another example, a first and second target users may be selected to define a range of values in-between them that correspond to a predetermined presence-related role. Each user having a target metric value in between the values of the first and second target users may be assigned the same presence-related role. In some exemplary embodiments, the selection of the target user may be performed by an administrator user or by another user.

On Step 370, a presence-related role out of the one or more roles defined on Step 320 may be assigned to one or more users, by applying the mapping function defined on Step 340 on the target metric value computed for the user.

For illustrative purposes, an exemplary assignment of presence-related roles to users per zones is provided in Table 1. In this example, user "1" is assigned to be a co-dominator of Zone A and a dominator of Zone B. User "2" is a co-dominator of Zone A and a member of Zone B, User "7" is a stakeholder in both Zones A and B, and User "4" is a member of Zone A and has no role with respect to Zone B.

TABLE 1

|        | Dominator | Co-Dominator | Member  | Stakeholder |
|--------|-----------|--------------|---------|-------------|
| Zone A |           | 1, 2, 3      | 4, 5, 6 | 7           |
| Zone B | 1         |              | 2, 3    | 7, 10, 11   |

In some exemplary embodiments, a redefinition of the zones initially defined on Step 310 may be performed based on the presence-related role assignment performed on Step 370. For example, adjacent zones may be aggregated together based on a similarity in the presence-related roles assigned to a user or group of users in each zone. Additionally or alternatively, zones boundaries may be re-demarcated, i.e. added, deleted or modified based on the presence-related roles, such as, for example, as to enclose concentrations of users with certain roles types.

On Step 380, engagement with one or more users based on the presence-related role assigned to each of them on Step 370 may be performed, such as access control or subscription management, push notifications triggering, or the like. Additionally or alternatively, the assigned presence-related role may be utilized for computing more complex analytics of presence data, performing optimization, evaluating or triggering rules, or the like.

Figure 4:
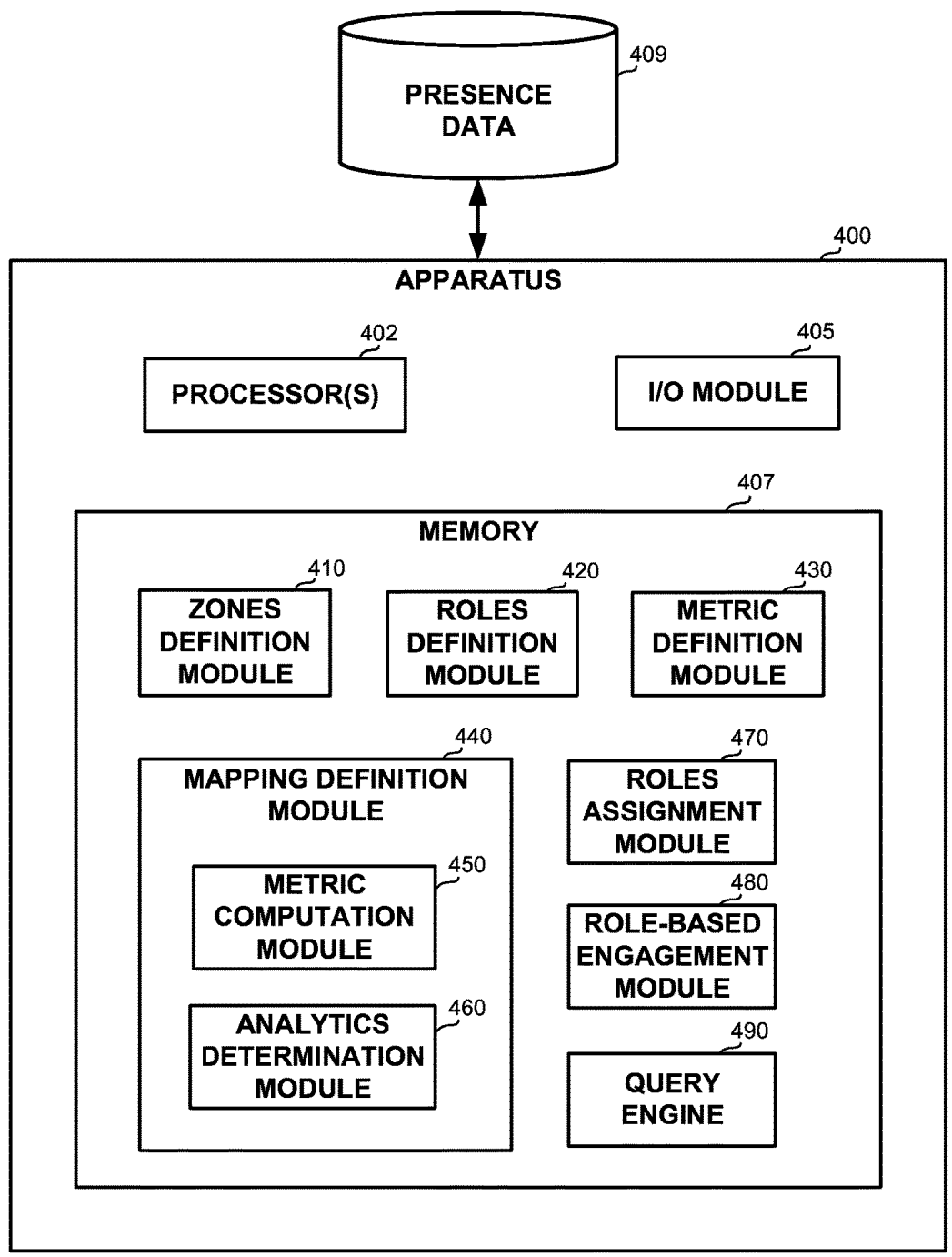
FIG. 4 shows a block diagram of an apparatus, in accordance with some exemplary embodiments of the disclosed subject matter.

Referring now to FIG. 4 showing a block diagram of an apparatus in accordance with some exemplary embodiments of the disclosed subject matter.

In some exemplary embodiments, Apparatus 400 may comprise one or more Processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) Module 405. I/O Module 405 may be utilized to provide an output to and receive input from a user or another Apparatus 400.

In some exemplary embodiments, Apparatus 400 may comprise a Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 400.

Apparatus 400 may comprise or be in communication with Presence Data 409. Presence Data 409 may comprise presence or location data of a plurality of users in one or more location areas or spaces. Presence Data 409 may be retained in a storage device or a database server accessible via any suitable communication channel, such as, for example, over the Internet.

Zones Definition Module 410 may be configured for defining one or more zones of interests in a location area occupied by a plurality of users or other kinds of moving objects. Zones Definition Module 410 may define the zones based on segments of the location area induced by a natural grid. Additionally or alternatively, Zones s Definition Module 410 may obtain a custom definition of zones, e.g. specified by a user.

Roles Definition Module 420 may be configured for defining one or more presence-related roles, describing categories of spatiotemporal occupancy relation between a user and a zone. In some exemplary embodiments, the presence-related roles defined by Roles Definition Module 420 may be ordinal as well as categorical. For example, the presence-related roles may comprise roles selected from the group comprising: Presence Dominator, Presence Co-Dominator, Presence Member, and Presence Stakeholder, or the like. Roles Definition Module 420 may obtain the definition of the presence-related roles from an external source, such as a user or another component of Apparatus 400 or a system in which Apparatus 400 is integrated.

Metric Definition Module 430 may be configured for defining a target metric describing a measure of user presence in a location. In some exemplary embodiments, Metric Definition Module 430 may define the target metric with respect to a given zone and/or a time window. Metric Definition Module 430 may further define time resolution or intervals at which the target metric is to be computed. Metric Definition Module 430 may obtain the definition of the target metric from a user or another outer source, similarly as Zones Definition Module 410 and/or Roles Definition Module 420.

Mapping Definition Module 440 may be configured for defining a mapping function between values of the target metric defined by Metric Definition Module 430 and the presence-related roles defined by Roles Definition Module 420. In some exemplary embodiments, Mapping Definition Module 440 may define the mapping function a priori, independent of particular analytics of Presence Data 409. In other exemplary embodiments, Mapping Definition Module 440 may define the mapping function a posteriori, based on determined analytics of Presence Data 409, such as a distribution of values of the target metric or likewise statistical attributes.

Metric Computation Module 450 may be configured for computing a value of the target metric defined by Metric Definition Module 430 for each of the plurality of users based on Presence Data 409. Metric Computation Module 450 may compute the value of the target metric for each user in each of the zones defined by Zones Definition s Module 410.

Analytics Determination Module 460 may be configured for determining analytics of Presence Data 409 required by Mapping Definition Module 440. In some exemplary embodiments, Analytics Determination Module 460 may obtain the target metric values computed by Metric Computation Module 450 and determine or estimate a distribution thereof. Additionally or alternatively, Analytics Determination Module 460 may determine clusters of the target metric values, which clusters may be used by Mapping Definition Module 440 to define the mapping to the presence-related roles.

Roles Assignment Module 470 may be configured for assigning a presence-related role to one or more users based on the target metric value computed for each of those users by Metric Computation Module 450. Roles Assignment Module 470 may assign one of the presence-related roles defined by Roles Definition Module 420 to a user by applying the mapping function defined by Mapping Definition Module 440 on the respective target metric value. In some exemplary embodiments, the presence-related roles assigned by Roles Assignment Module 470 may be utilized by Zones Definition Module 410 for redefining the one or more zones based thereon.

Role-Based Engagement Module 480 may be configured for engaging a user or group of users based on the presence-related role assigned thereto. In some exemplary embodiments, wherein Role-Based Engagement Module 480 may reside on an external device, such as another apparatus, and/or be deprived of access to Presence Data 409 or any other subcomponents of Apparatus 400, Role-Based Engagement Module 480 may perform the user engagement by utilizing a role-based interface that may be provided thereto by Apparatus 400, whereby indicating presence-related roles potentially without disclosing private data related to users' location. In some exemplary embodiments, Role-Based Engagement Module 480 may be configured to evaluate and trigger rules based on the presence-related roles, such as granting or denying access based on the presence-related role of a user, issuing a notification to a user based on her presence-related role, or the like. Additionally or alternatively, the roles may be employed by an external device or entity which may not necessarily have an understanding of or access to the underlying presence data.

Query Engine 490 may be configured to process queries from external devices and provide results to such queries. Query Engine 490 may respond to a query by providing a presence-related role of a user indicated in the query with respect to a zone indicated in the query, potentially with respect to a timeframe defined in the query. In some exemplary embodiments, Query Engine 490 may be configured to respond to a query that defines a single zone of interest, by invoking Zones Definition Module 410 to dynamically aggregate a plurality of zones to obtain the single zone of interest. Query Engine 490 may further be configured to provide results based on the zone of interest. In some exemplary embodiments, the query's results may comprise a presence-related role of a user in the dynamically defined zone, which may be dynamically computed in response to the query after aggregating the plurality of zones.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to s flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in s the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   receiving presence data of a plurality of users in a space comprised of one or more zones;
   computing for each user of the plurality of users a value of a target metric in a zone based on the presence data, the target metric defining a measure of user presence; and
   assigning a presence-related role to a user with respect to the zone, the presence-related role being comprised in a set of one or more presence-related roles describing categories of spatiotemporal occupancy relation between the user and the zone, wherein said assigning comprises applying a mapping function on the value, the mapping function maps between values of the target metric and the one or more presence-related roles, the mapping function is affected by analytics of the presence data,
   wherein the categories of spatiotemporal occupancy relation are ordinal.

2. The computer-implemented method of claim 1, wherein the presence-related roles comprise one or more roles selected from the group consisting of: a presence dominator; a presence co-dominator; a presence member; and a presence stakeholder.

3. The computer-implemented method of claim 1, wherein the target metric is discrete, wherein the analytics of the presence data comprise a distribution of values of the target metric, wherein the distribution is determined by computing a histogram of the values.

4. The computer-implemented method of claim 3, wherein the mapping function is determined using quantiles or trough points of the histogram.

5. The computer-implemented method of claim 1, wherein the target metric is continuous, wherein the analytics of the presence data comprise a distribution of values of the target metric, wherein the distribution is determined by estimating a probability density function.

6. The computer-implemented method of claim 5, wherein the mapping function is determined using quantiles or trough points of the probability density function.

7. The computer-implemented method of claim 1 wherein the target metric is continuous, the method further comprising determining clusters of the values of the target metric, whereby clusters representative of users are determined; and determining a mapping between clusters and the one or more presence-related roles, wherein the mapping is utilized to perform said assigning.

8. The computer-implemented method of claim 1, wherein the one or more zones are natural grid based zones.

9. The computer-implemented method of claim 1, wherein the one or more zones are user defined zones.

10. The computer-implemented method of claim 1, wherein the target metric is defined over a given time window.

11. The computer-implemented method of claim 1, further comprising redefining the one or more zones based on the presence-related role.

12. The computer-implemented method of claim 11, wherein said redefining comprises aggregating adjacent zones based on similarity in the presence-related roles assigned with respect thereto to each user of at least a portion of the plurality of users.

13. The computer-implemented method of claim 1, wherein said assigning comprises assigning a first presence-related role with respect to a first set of one or more time segments, and assigning a second presence-related role with respect to a second set of one or more time segments.

14. A computerized apparatus having a processor, the processor being adapted to perform the steps of:
receiving presence data of a plurality of users in a space comprised of one or more zones;
computing for each user of the plurality of users a value of a target metric in a zone based on the presence data, the target metric defining a measure of user presence; and
assigning a presence-related role to a user with respect to the zone, the presence-related role being comprised in a set of one or more presence-related roles describing categories of spatiotemporal occupancy relation between the user and the zone, wherein said assigning comprises applying a mapping function on the value, the mapping function maps between values of the target metric and the one or more presence-related roles, the mapping function is affected by analytics of the presence data,
wherein the categories of spatiotemporal occupancy relation are ordinal.

15. The computerized apparatus of claim 14, wherein the presence-related roles comprise one or more roles selected from the group consisting of: a presence dominator; a presence co-dominator; a presence member; and a presence stakeholder.

16. The computerized apparatus of claim 14, wherein the analytics of the presence data comprise a distribution of values of the target metric.

17. The computerized apparatus of claim 14, wherein said processor is further adapted to perform: redefining the one or more zones based on the presence-related role.

18. The computerized apparatus of claim 14, wherein said assigning comprises assigning a first presence-related role with respect to a first set of one or more time segments, and assigning a second presence-related role with respect to a second set of one or more time segments.

19. A computer program product comprising a non-transitory computer readable storage medium retaining program instructions, which program instructions when read by a processor, cause the processor to perform a method comprising:
receiving presence data of a plurality of users in a space comprised of one or more zones;
computing for each user of the plurality of users a value of a target metric in a zone based on the presence data, the target metric defining a measure of user presence; and
assigning a presence-related role to a user with respect to the zone, the presence-related role being comprised in a set of one or more presence-related roles describing categories of spatiotemporal occupancy relation between the user and the zone, wherein said assigning comprises applying a mapping function on the value, the mapping function maps between values of the target metric and the one or more presence-related roles, the mapping function is affected by analytics of the presence data,
wherein the categories of spatiotemporal occupancy relation are ordinal.

* * * * *